Oct. 20, 1931. C. P. McCORMICK 1,828,333
TIRE BOOT
Filed Sept. 5, 1930
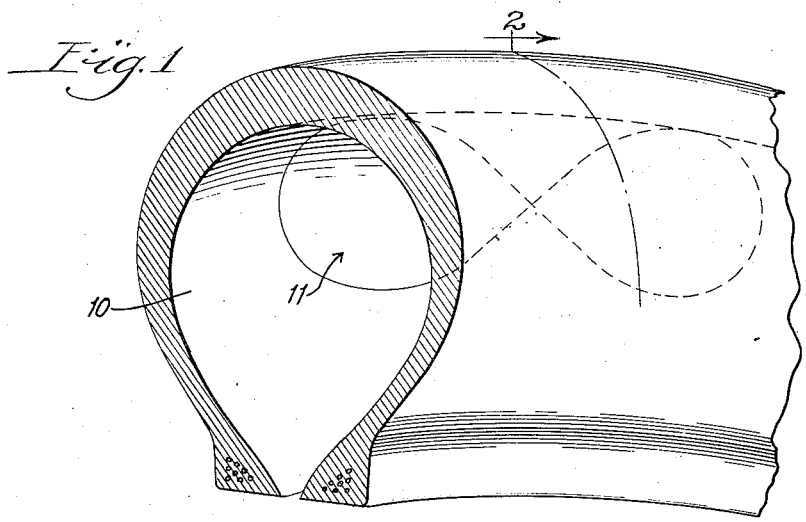
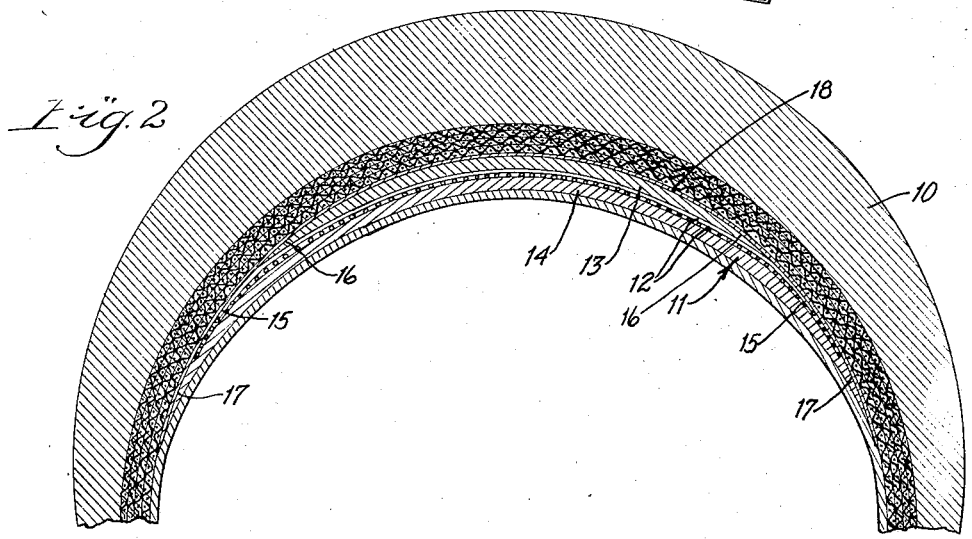
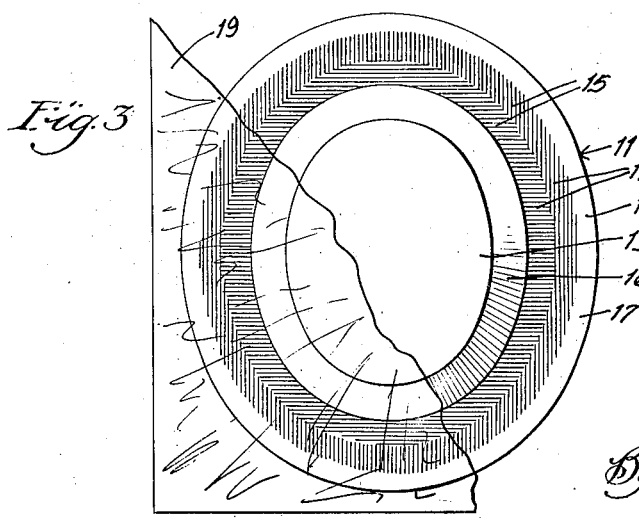
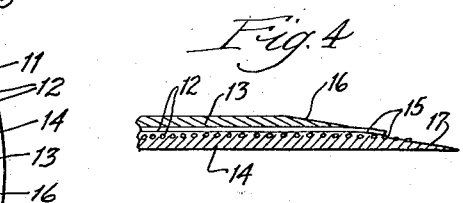
Inventor:
Charles P. McCormick,
By Manning & Manning
Attys.

Patented Oct. 20, 1931

1,828,333

UNITED STATES PATENT OFFICE

CHARLES P. McCORMICK, OF CHICAGO, ILLINOIS

TIRE BOOT

Application filed September 5, 1930. Serial No. 479,827.

This invention relates to tire boots, or blowout patches for pneumatic tire casings.

According to the invention the tire boot comprises a textile layer enclosed between two layers of rubber, the textile layer being exposed at the edges of the boot so as to become adhesively secured directly to the inside of the tire casing. When applied to the tire casing the outer rubber layer is adapted to contact with the inner tube, the inner rubber layer and the edges of all three layers being adhesively secured to the tire casing.

The invention will readily be understood from the following description taken in conjunction with the accompanying drawings, in which—

Figure 1 is a perspective detail, partly in section, showing a boot secured to a tire casing;

Fig. 2 is a section, on a larger scale, on the line 2 of Fig. 1,

Fig. 3 is a plan of the boot showing the inner side which is applied to the tire casing, and Fig. 4 is a detail fragmental cross section through the boot.

Referring to the drawings, the numeral 10 designates a tire casing, to which is applied a boot 11. The boot 11 comprises a fabric layer 12, an inner layer of rubber 13, which is adapted to bear against the inside face of the casing, and an outer rubber layer 14, which is adapted to contact with the inner tube.

The fabric layer 12 may be of any suitable type, for example, the fabrics employed in tire casing manufacture are highly suitable. The boot may suitably be formed by vulcanizing the two rubber layers to an intermediate layer of rubberized fabric, and finally trimming the edges. Preferably, the boot is formed concave-convex so as to conform to the inner surface of the casing. The boot may be of any desired configuration but is preferably substantially circular or oval in plan, as shown in Fig. 3.

The edges of the boot are beveled or oblique so that they are of substantial width and expose substantial peripheral areas of all three layers, including the fabric layer. In Fig. 3 the exposed peripheral area of the fabric layer is designated 15, and the exposed peripheral area of the rubber layers 13 and 14 are designated 16 and 17, respectively. It is preferred to form the edges by cutting through the boot obliquely so as to expose substantial areas of the three layers.

The inner or convex side of the boot, including the beveled edge, has applied thereto an adhesive coating 18 for securing the boot to the inside of the casing. It is preferred to apply the adhesive cement to the face of the boot during manufacture and apply a sheet of cellophane 19, or other protective material, to preserve the cement in adhesive condition until use.

When the boot is applied to the casing the inner rubber layer adheres directly to the casing, while the exposed peripheral area 15 of the fabric layer is directly cemented to the casing fabric providing a secured direct anchorage thereto. The exposed peripheral area 17 of the outer rubber layer 14 is also secured directly to the casing fabric so as to completely enclose the fabric layer and prevent any contact between same and the inner tube.

The layer of fabric is ordinarily built up of cords or strands having a tensile strength sufficient to impart to a weakened casing the degree of reinforcement necessary for continued service. The character of the fabric layer is such as to present a relatively rough surface which possibly, under a condition of tire inflation, will pinch or injure the tube which presses against the boot. According to my improved boot construction, the inner and outer layers of rubber serve only in protecting capacities, and the intermediate fabric layer furnishes the entire reinforcement. The effectiveness of the boot is furthermore enhanced by the direct anchoring engagement between the fabric layer and the casing, together with the protection to the tube afforded by engagement of the outer layer therewith.

I claim:

A tire boot comprising an intermediate fabric layer and pliable rubber layers of substantial thickness secured thereto on each side thereof, the edges of the boot being beveled to expose a substantial peripheral area of the fabric layer between the rubber marginal portions on either side of the exposed peripheral area of the fabric layer whereby the same may be cemented directly to the tire casing between the marginal portions and a substantial peripheral area of a rubber layer extending beyond the fabric layer to completely enclose the same when the boot is cemented to a tire casing.

CHARLES P. McCORMICK.